United States Patent [19]
Smith

[11] Patent Number: 5,480,665
[45] Date of Patent: Jan. 2, 1996

[54] APPARATUS AND METHOD FOR REMOVING COMPOUNDS FROM A SOLUTION

[76] Inventor: Clark R. Smith, 557 Mission Blvd., Santa Rosa, Calif. 95409

[21] Appl. No.: 218,920

[22] Filed: Mar. 28, 1994

Related U.S. Application Data

[63] Continuation-in-part of Ser. No. 880,659, May 8, 1992, abandoned.

[51] Int. Cl.$^6$ ............................ B01D 63/00; C12G 3/00; C12H 1/00
[52] U.S. Cl. .................. 426/490; 210/195.2; 210/257.2; 210/652; 426/271; 426/330.4; 426/330.5; 426/494
[58] Field of Search ................................. 426/478, 490, 426/494, 271, 330.4, 330.5; 210/652, 195.2, 257.2

[56] References Cited

U.S. PATENT DOCUMENTS

| | | | |
|---|---|---|---|
| 4,205,092 | 5/1980 | Mattick et al. | 426/271 |
| 4,499,117 | 2/1985 | Bonneau | 426/494 |
| 4,617,127 | 10/1986 | Light | 210/195.2 |
| 4,792,402 | 12/1988 | Fricker | 210/652 |

FOREIGN PATENT DOCUMENTS 0460339  12/1991  European Pat. Off. ........ B01D 61/58

*Primary Examiner*—George Yeung
*Attorney, Agent, or Firm*—Dergosits & Noah

[57] ABSTRACT

Method and apparatus for the treatment of fluids, particularly wine, to remove unwanted substances. The wine is treated in a reverse osmosis (R.O.) treatment unit, generating a retentate and a raw permeate. The membrane for the R.O. unit is selected to pass in the permeate the unwanted substances, such as volatile acidity (ethyl acetate and acetic acid). The raw permeate is subjected to a treatment column. In the case of volatile acidity, this is an anion exchange column, which removes the acetic acid from the permeate by anion exchange and removes the ethyl acetate by base hydrolysis. This produces a purified permeate, which is depleted in volatile acidity, but contains other components desirable for the wine. The purified permeate is then recombined with the retentate from the R.O. column, and the result is wine with the volatile acidity and little else removed. This wine may be recirculated through the system to remove yet more of the volatile acidity. Before the anion exchange step, a low-energy distillation may be used to remove $CO_2$, $H_2S$, or other relatively volatile compounds. To remove acetaldehyde, a low-energy distillation column is used instead of the anion exchange column, and the distillation residue constitutes the purified permeate that is recombined with the retentate from the R.O. column. A high-energy distillation column may be used to separate out alcohol and water, and then add either the alcohol or the water back to the R.O. retentate, thus producing either a higher alcohol or a lower alcohol beverage.

25 Claims, 3 Drawing Sheets

APPARATUS AND METHOD FOR REMOVING COMPOUNDS FROM A SOLUTION

This application is a continuation-in-part of U.S. application Ser. No. 880,659 filed May 8, 1992, now abandoned.

BACKGROUND OF THE INVENTION

The present invention is directed to the removal of unwanted compounds from liquids, and in particular to a recirculative treatment process and apparatus for removing undesirable components from wine.

It is a persistent problem in the production of wine that certain compounds are generated in intolerable concentrations, among which are ethyl acetate, acetic acid and acetaldehyde. These compounds appear naturally in wine, but are regarded as spoilage components because they so alter the flavor and aroma of the wine. Other components that may be considered undesirable include $H_2S$, ethyl mercaptan, dimethyl sulfide, and $CO_2$.

It is possible to remove certain undesirable components in juices by reverse osmosis treatment, but this also removes important flavor and aroma components, resulting in a change in the nature of the wine in addition to volume loss and concentration effects. For instance, in U.S. Pat. No. 4,401,678 to Beaumont, a process for removing methyl anthranilate (which occurs in high concentration in *Virus labrusca* grapes) from grape juice by means of reverse osmosis treatment is discussed. The portion of the juice which passes through the reverse osmosis membrane, containing methyl anthranilate and other volatile esters as well as sugars and acids, is discarded, and the retentate is diluted with water to compensate for the higher concentration due to the reverse osmosis treatment. While this process does remove at least some of the undesirable components, it also removes many desirable components, so that the resulting juice is not suitable for making standard wines from *Vitus vinifera* grapes, i.e. classic wine grapes. In certain areas, such as California, the addition of water also renders the juice illegal for the production of standard wine.

There are other processes presently used for removing organic components from a fluid. For instance, in U.S. Pat. No. 4,643,902 to Lawhon et al. (particularly applicable to orange and grapefruit juice), ultrafiltration is used to isolate spoilage enzymes in a retentate, with the remainder of the juice in a permeate. The enzymes are deactivated, and the permeate and retentate may then be recombined. The permeate may be subjected to a reverse osmosis (R.O.) treatment to concentrate the juice before recombination with the ultrafiltration retentate. After R.O. treatment and before recombination, the juice (i.e. R.O. retentate) may further be treated to deacidify it, such as by the use of an ion-exchange column. This produces a concentrate which is eventually rediluted (perhaps with the R.O. permeate, consisting of water) to reconstitute the juice.

This process would be deleterious in the production of high quality wine or any juice where the impact on the flavors and aromas is to be minimized, because anion exchange of the retentate removes both the undesirable components and components which are essential to the quality and value of the product.

Another approach to the removal of undesirable components from a fluid is discussed in the U.S. Pat. No. 4,808,287 to Hark, which uses R.O. treatment to produce ultrapure water. However, this disclosure is directed to the opposite of a problem solved by the present invention; it has as goals removing the components in the retentate (which are impurities), and keeping the entirety of the permeate.

There is thus a need for a process which can both selectively remove the undesirable components from a wine or juice and at the same time avoid concentration effects and minimize (1) the removal of components which provide aesthetic appeal, and (2) reduction in volume of the final product.

SUMMARY OF THE INVENTION

The invention involves a two-stage treatment of wine or other fluid. In the first stage, the wine is subjected to R.O. treatment to remove the ethyl acetate and acetic acid (collectively referred to as "volatile acidity", or V.A.) from it. The permeate (containing the V.A.) is retained, and is itself passed through an anion exchange column. The anion exchange column provides high-pH conditions which hydrolize ethyl acetate to ethanol and acetic acid, and the positively-charged column adsorbs substantially all of the acetate. The acetate comes both directly from the wine, passing through with the permeate, and from ester cleavage.

This selectively removes substantially all of the V.A. from the permeate, after which it is recombined with the retentate from the R.O. unit. This replaces the desirable components back into the main bulk of the wine, and the recombined wine is passed through the system again. In each pass, an additional amount of V.A. is removed, while removal of desired flavors and aromas is minimized.

This overcomes the problem of the prior approach of treating the wine merely by a reverse osmosis process. It solves a problem different from that solved in the Beaumont patent, which was directed only to the removal of certain components, and not to the retention of others.

A variation on this invention uses a low-energy distillation column before treating the wine by the anion exchange, the distillation removing a substantial portion of at least one highly volatile compound from the wine, while allowing substantially all alcohol to remain in the wine. Such (relatively) highly volatile compounds may include any one or more of $CO_2$, $H_2S$, ethyl mercaptan and dimethyl sulfide.

In an alternative embodiment, the invention may also be used to remove acetaldehyde from wine, which is responsible for characteristics of sherries, and is thus desirable in those wines but not in standard table wines. Unless one specifically wants to make sherry, acetaldehyde is regarded as a spoilage component. In order to remove it, the R.O. membrane is selected for the appropriate characteristics, and the treatment column may be a low-temperature (or other low-energy) distillation column instead of an anion exchange column.

Another embodiment uses a high-energy distillation column to remove alcohol from the permeate before returning it to the retentate. Still another embodiment involves discarding water from the bottom of the distillation column, and recombining the ethanol from the distillation column with the R.O. retentate, resulting in intensified flavors and alcohol in wine made from underripe fruit.

DESCRIPTION OF THE PREFERRED EMBODIMENTS

Although the present invention has a number of applications, the following discussion is primarily in terms of its use in the removal of undesirable components from wine. However, the inventive concept can be used in general to remove components from wine which may have value in another setting, and as will be discussed can even be used to selectively increase or decrease the concentration of particular components, such as ethanol.

Figure 1:
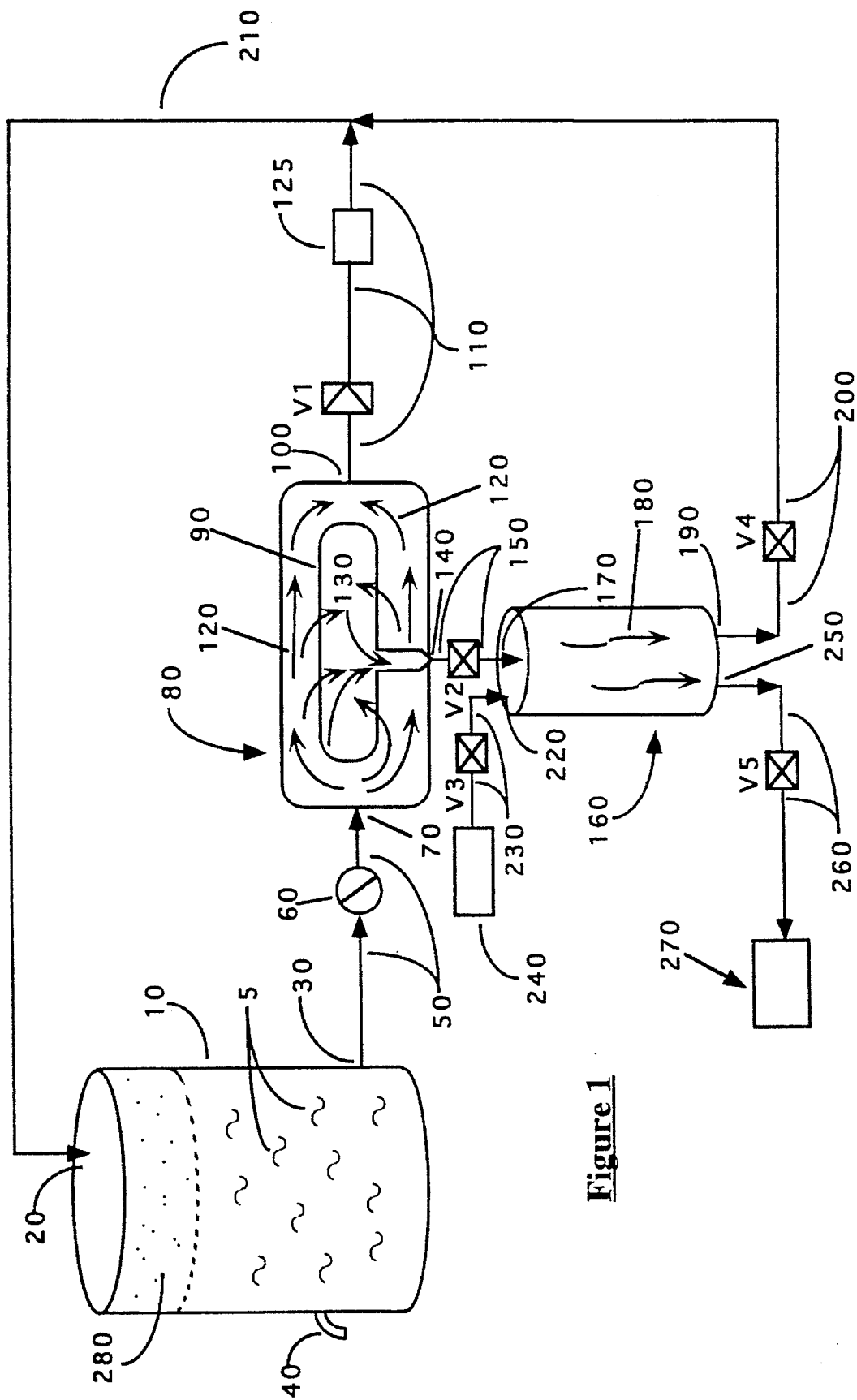
FIG. 1 shows an apparatus for implementing the method of treating fluids according to the invention.

The apparatus for carrying this out is shown in FIG. 1. The method for the use of this apparatus will first be described below, followed by details as to specific implementation in the case of treating wine for volatile acidity (ethyl acetate or acetic acid) and acetaldehyde.

The Basic Procedure

Wine 5 is stored a tank 10 having an inlet 20, an outlet 30, and a tap 40. A pipe 50 connects the outlet 30 via a pump 60 to the inlet 70 of a conventional reverse osmosis (R.O.) treatment unit 80.

The pump 60 develops the high pressures necessary to effect the reverse osmosis treatment, and for this purpose a back-pressure valve V1 is used at the downstream side of the R.O. unit 80. Valve V1 is adjustable to create the proper operating pressure for the R.O. unit.

A typical R.O. unit may run at, for example, 450–500 psi, so once the pump 60 is running, the valve V1 will be closed off to the extent necessary to achieve this pressure. (Different units may require different pressures.) Standard minimum and maximum pressure cut-off safety switches may also be provided in the pipe 50, downstream of the pump 60.

The R.O. unit 80 includes a conventional R.O. membrane 90, and has an outlet 100 coupled to a pipe 110, into which a retentate 120 of the R.O. unit 80 is conveyed. The retentate includes most of the original constituent compounds of the solution.

It will be appreciated that the membrane 90 is conventional, and is selected on the basis of characteristics (e.g., the molecular weights which the membrane will pass) which are designed to remove particular, predetermined undesirable substances-in this case, ethyl acetate and acetic acid. Some membranes may be more efficient than others at removal of a particular component, and some empirical testing will generally be necessary to find the most efficient. In the present application, a MILLIPORE R25A membrane has been found to be effective at removing V.A., i.e. passes the volatile acidity to be removed by anion exchange while retaining other substances, such as substantially all malic acid and tartaric acid. Other suitable membranes are the MILLIPORE NANOMAX 95 membrane and the PUROLITE A103 and A107 anion exchange resins.

The retentate is inevitably heated by the pumping process, due to the high pressures. While this may not be of concern in the treatment of some fluids, for wine it is a problem because it unacceptably changes the characteristics of the beverage. Therefore, a heat exchanger 125 is coupled into the flow of the pipe 110 to bring the temperature down to a desired level, in this case preferably no more than about 70° F. Conventional R.O. units actually operate more efficiently at higher temperatures, so there is a balance to be achieved between efficiency of R.O. treatment and minimizing unwanted effects of heat on the solution.

The R.O. unit 80 also produces a raw permeate 130, which passes through an outlet 140 into a pipe 150. The raw permeate 130 is then conveyed through a treatment column 160 via an inlet 170. In the embodiment for removing volatile acidity (V.A.) from wine, the treatment column 160 comprises an anion exchange column (or may alternatively be an electrodialysis unit). In a manner discussed in detail below, the column 160 removes some (and preferably substantially all) of the V.A. or other undesirable component from the wine, and produces a purified permeate 180 which passes through an outlet 190 and into a pipe 200.

The pipes 190 and 110 are preferably coupled into a single pipe 210, so that the purified permeate 180 is mixed with the retentate 120 from the R.O. unit 80. The product may at this point be drawn off at tap 40, or may be recirculated in the system to remove yet more of the V.A.

In order to prevent oxidation of the wine, a nitrogen cap 280 is created on the wine tank, and the entire system is hermetically sealed.

The Action of the Column

The column 160 at the beginning of the procedure is in a condition which optimizes the removal of the components in question. With V.A., it has been found that an initial pH of about 11 for the column is effective. Thus, the column is initially charged in a conventional fashion (such as by flushing with a 4% KOH solution) to this pH, and is then rinsed, if desired, to remove potassium. The flushing may be forward-flushing (from top to bottom) or back-flushing (from bottom to top). Several dead volumes (i.e. volumes of the resin column) are passed through.

The resin in the charged column includes R—NH2 groups covalently bonded to the resin of the anion exchange column. These groups form R—NH3+ groups, due to interaction with the low-pH raw permeate (which in this case includes acetic acid, which is partially ionized and present as acetate). The NH3+ binds electrostatically with the acetate, thereby preventing it from passing through as part of the purified permeate. This results in the gradual lowering of the pH of the column.

As the raw permeate passes through the anion exchange column, ethyl acetate does not interact with the R—NH3+ groups in the same manner as the acetate does. However, the column is at a basic pH (as noted above, it is initially charged to about pH 11). The column becomes more and more acidic as a greater amount of acetate is extracted of the raw permeate as discussed above. Thus, a pH gradient develops, with lower-pH resin (more acidic) at the top, and higher-pH resin (more basic) at the bottom. As the ethyl acetate approaches the regions of high pH, it is base hydrolyzed, resulting in ethanol and acetic acid. The acetic acid is then ionized and adsorbed by the column in the manner described above.

The purified permeate is thus reduced in both ethyl acetate and acetic acid. Since the R.O. unit does not remove all of the acetate and ethyl acetate from the retentate (65% is more typical), the purified permeate and the retentate are mixed back into the tank of wine. The remixed solution is run through the process repeatedly, until a desired low level of the unwanted substances is achieved.

The resin in the column 160 is conventional, and for a given application, one familiar with anion exchange columns will be able to select a suitable resin. For the present embodiment, it has been found that a PURALITE™ A-107 resin is effective for removing V.A.

Recharging the Column

After a period of use, the anion exchange column 160 will be depleted, i.e. will be in such an acidic condition that it will not be very effective for removing the V.A. While this is a matter of degree, in the present embodiment the column is considered depleted when the pH of the liquid exiting at the bottom of the column is about 5. It may also be determined as a function of the amount of V.A. or other undesired substance remaining in the permeate exiting the column.

When the column is depleted, it must be recharged. This is a standard procedure in the use of such columns, and is basically carried out as follows. As shown in FIG. 1, the pipe 150 includes an in-line valve V2, and the column 160 includes another inlet 220 into which is coupled a pipe 230 connected to a container 240 of KOH solution. A valve V3 is positioned in line with the pipe 230.

A valve V4 is positioned in line with the pipe 200. The column 160 includes another outlet 250 coupled to a pipe 260, which includes an in-line discharge valve V5. The outlet of the pipe 260 leads to a discharge container 270.

To recharge the column 160, the pump 60 is turned off and valves V1 and V2 are closed, and then valve V3 is opened to allow the KOH solution to flow (by gravity or pumping) from container 240 into the column 160. This is done until about one bed volume of fluid has flowed into the column, and hence one bed volume of wine has been forced out of the column and into the pipe 200.

Before the KOH is passed through the column 160, an initial rinse with purified water may be used.

Valve V4 is then closed, and the discharge valve V5 is opened. The KOH (or water) now passes into the discharge container 270. This is essentially a potassium acetate solution, in the case of removing V.A. from wine.

The KOH solution is passed through the column 160 until it again reaches pH 11. It may then also be flushed (such as with purified, deoxygenated water), to remove free potassium ions, and it is ready to use as described before.

The above process is carried out in a manner to prevent the introduction of oxygen.

The procedure is carried out for as long as necessary to deplete the level of the undesired substance to a tolerable level. This is necessarily a matter of judgment, but in the case of wine, the threshold concentrations of various substances, including ethyl acetate and acetic acid, are well known within certain ranges.

Other Embodiments and Applications

In order to remove acetaldehyde from wine, the R.O. membrane 90 is selected to pass acetaldehyde in the raw permeate 130. In this case, the column 160 is preferably a low-energy distillation column, and the purified permeate 180 comprises the distillation residue. Thus, the anion exchange column is not used in this embodiment. The distillation process is well known, and is adapted for the removal of acetaldehyde, including recirculating the distillate (for multiple distillations), if desired. Other components that may be considered undesirable, and that can be removed by low-energy distillation, include $H_2S$, methyl or ethyl mercaptan, dimethyl sulfide, and $CO_2$.

Low-energy distillation, with or without sparging, of the alcohol/water permeate solution does not depend upon high distillation temperatures and is in this way distinct from high-energy distillation. Using low-energy distillation, highly volatile components (such as $H_2S$, methyl mercaptan, dimethyl sulfide, dissolved $O_2$ and $CO_2$) are removed from the solution while retaining substantially all the alcohol in the pot residue, which can then be returned to the wine. This allows for the removal of undesirable compounds from the permeate without affecting the alcohol composition of the resulting wine.

Figure 3:
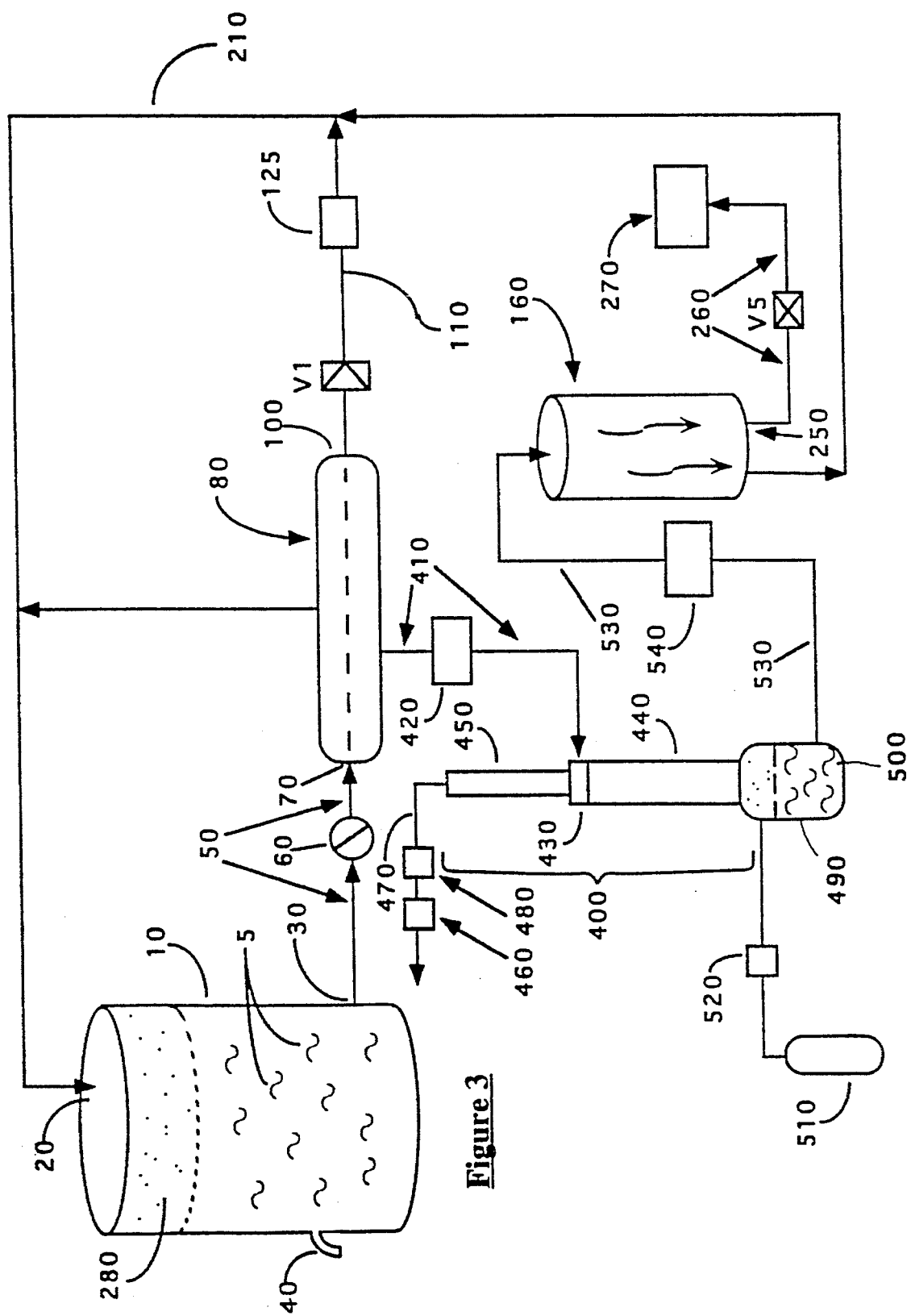
FIG. 3 shows an alternative to the apparatus of FIG. 1, for removing highly volatile compounds from fluids.

FIG. 3 shows an apparatus for removing highly volatile components from wine in conjunction with the apparatus and method as described with respect to FIG. 1. The reference numerals in FIG. 3 that are the same as those in FIG. 1 refer to parts that are essentially the same or identical. FIG. 3 shows the additional use of a conventional distillation column 400 which receives the raw permeate 130 via a pipe 410, which may pass through an optional heat-exchanger 420, to be described below. This setup is used to remove such highly volatile compounds as those discussed above before the wine or other fluid is passed through the anion exchange column, and a particularly advantageous use thereof is to remove $CO_2$ from wine to degas it before subjecting it to the anion exchange resin.

The permeate 130 is conducted to an inlet 430 of the distillation column 400, and in particular into a stripping section 440 of the distillation column, which also includes a reflux or liquid recovery section 450 (also referred to as a rectifying section).

Appropriate valves are used in the apparatus of FIG. 3 to control the flow of liquid at various points and to provide for recharging the anion exchange column 160 when necessary without losing vacuum from the distillation column 400. Several suitable configurations may be arrived at without further teaching, referring for instance to the configuration shown in FIG. 1 and the foregoing text describing the recharging of the column 160. Thus, further detail on this point is not provided relative to FIG. 3.

When the permeate 130 exits the R.O. unit 80, it may pass through the heat exchanger 420, which increases the efficiency of the distillation in the column 400, but does not boil the fluid. The permeate is then input into the still 400, which may distill the permeate either at substantially atmospheric pressure or at a relative vacuum. In the latter case, a vacuum pump 460 is used, coupled to an outlet pipe 470 connected to the recovery section 450. A condenser 480 may also be used, in order to recover in liquid form some or all of the distillate.

A pot 490 is connected to the stripping section 440, for receiving the liquid 500 remaining from the distillation process. A source (such as a pressurized tank) 510 of nitrogen ($N_2$) may be coupled to the pot 500 via a vacuum regulator 520. The nitrogen is used to sparge the wine, which in an otherwise substantially atmospheric-pressure distillation assists in stripping the highly volatile compounds from the wine and carrying them past the liquid recovery section 450 to the pipe 470. In a distillation process in which the vacuum pump 460 is used, nitrogen may still be used to sparge the wine, to increase the efficiency of the distillation process. In this case, the vacuum regulator 520 is used to ensure that vacuum is maintained while the $N_2$ is introduced, e.g. by ensuring that at least 80% vacuum is achieved before the introduction of the nitrogen.

Once the wine or other fluid has been distilled in the column 400, it is pumped to the anion exchange column 160 via a pipe 530, by means of a conventional pump 540. When vacuum distillation is used, the pump 540 should be a conventional eductor, specifically designed to operate properly under low-pressure conditions.

The method for using the apparatus of FIG. 3 thus includes the steps as described with respect to FIG. 1, with the addition of distilling the wine or other fluid in a low-energy distillation process, to remove highly volatile compounds while retaining substantially all of the important flavor components, alcohol, and other lower-volatility compounds. Importantly, the wine is not brought to the boiling point of any compound which it is desired to retain.

The temperature and pressure can easily be adjusted to result in greater or lesser loss of such retained compounds, and likewise to distill out less or more, respectively, of undesired, more highly volatile compounds. The amount and pressure of nitrogen introduced into the pot 490, and the amount of vacuum generated by the vacuum pump 460, will likewise be adjusted to affect these factors. All of these are variables that the individual user of the apparatus will determine for a particular fluid and relative to particular desired and undesired compounds.

The use as described above of the apparatus of FIG. 3 results in a wine where alcohol and important flavor components are retained but the more highly volatile components, such as those discussed above, are removed. In particular, it allows for the degasification (by removal of $CO_2$) of the wine before submitting it to the anion exchange step.

Application of the above-discussed method and apparatus to other fluids may also be made. In each case, the R.O. membrane is selected to pass in the raw permeate the substance to be excluded. This is followed by the treatment, such as anion exchange, electrodialysis or distillation, which is adapted for the removal of the specific substance in question. Then follows the recombination with the retentate from the R.O. unit. The recombined fluid may be used at that point, or it may be recirculated into the system for further purification.

The treatment column 160 may alternatively be a high-energy distillation column, so that the apparatus may be used to either increase or decrease the amount of alcohols (such as ethanol) in wine or other beverages. The alcohol is separated out by distillation in a conventional fashion. If the alcohol level is to be decreased, then the distillation residue (lower in alcohol) is taken as the purified permeate 180, and is recombined with the retentate. In this case, alcohol is considered the undesired component to be removed, although it may still be valuable for other purposes.

If the alcohol level is to be increased, then the distillate (higher in alcohol) is taken as the purified permeate 180, and is recombined with the retentate. In this case, water is considered the undesired component.

In the embodiments wherein the treatment column is a distillation column, then such an intricate flushing apparatus as that shown in FIG. 1 (for embodiments where the treatment column 160 is an anion exchange column) is not needed. However, conventional methods of cleansing the distillation column should be used.

In general, the undesired component, be it an aesthetically displeasing compound, a diluent or otherwise, can be selectively targeted for removal by this method and apparatus.

Figure 2:
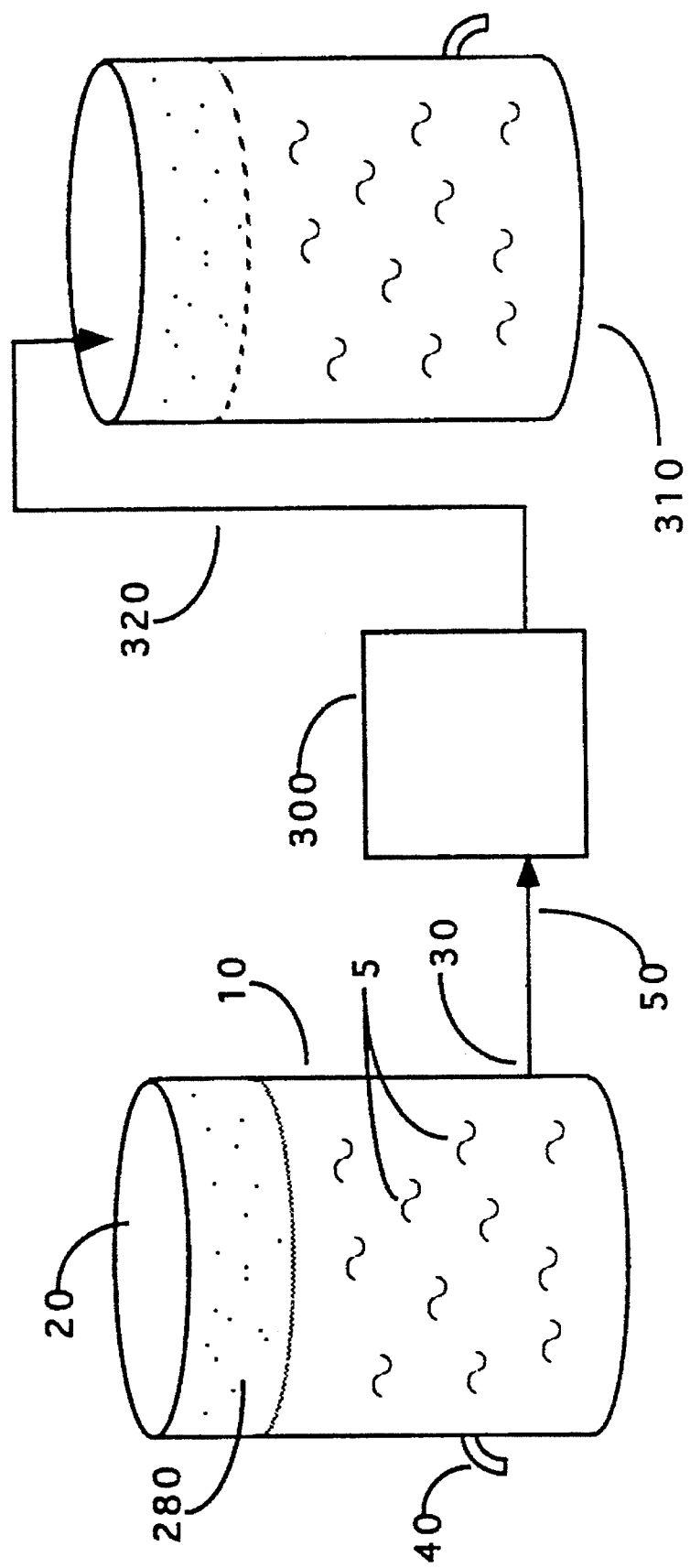
FIG. 2 shows an alternative to the apparatus of FIG. 1.

Another variation on the invention is illustrated in FIG. 2, wherein the numeral 300 generally designates the treatment apparatus of the invention as shown in FIG. 1, other than the tank 20 and pipe 50. In this embodiment, the treated, recombined solution from tank 20 is conveyed via a pipe 320 to another tank 310. If desired, it may be run through the treatment apparatus 300 again, from tank 310 to tank 20, using pipes (not separately shown) which are in a configuration opposite that of pipes 50 and 320. All of these pipes preferably include appropriate valves (not separately shown) to control the flow of the fluids into and out of the appropriate tanks, and the fluids may be gravity fed or pumped as desired.

The configuration of FIG. 2 is advantageous in that it conveys all of the solution 5 through the R.O. unit in a single pass, which is more efficient for removing the undesired substances. The treated solution, in the reverse configuration mentioned above, again is conveyed through the R.O. unit in a single pass. This leads to higher overall efficiency and speed in removing unwanted components from the solution. As in the circulative embodiment of FIG. 1, the process is carried out enough times to remove as much of the unwanted components as desired.

I claim:

1. An apparatus for removing at least one predetermined component from a solution, including:

means for holding the solution, having a first inlet and a first outlet;

a reverse osmosis unit having a second inlet coupled to said first outlet and further having a second outlet and a third outlet;

means for driving the solution through said reverse osmosis unit for producing a retentate at said second outlet and a raw permeate at said third outlet;

a heat exchanger coupled to said second outlet for controlling the retentate temperature;

a treatment column having a fourth outlet and having a third inlet coupled to said third outlet for conveying the raw permeate therethrough for producing a purified permeate, with at least a portion of the predetermined component removed, at said fourth outlet;

means connected to said fourth outlet and to said heat exchanger for combining the entire purified permeate with the retentate to produce a treated solution.

2. The apparatus of claim 1, wherein said treatment column is an anion exchange column.

3. The apparatus of claim 1, wherein said treatment column is a distillation column.

4. The apparatus of claim 1, further including means for passing the treated solution again through the apparatus.

5. The apparatus of claim 1, wherein:

the at least one predetermined component includes acetic acid;

said reverse osmosis unit includes a membrane configured for passing at least acetic acid in said raw permeate; and said treatment column is an anion exchange column for removing acetic acid from the raw permeate.

6. The apparatus of claim 5, wherein:

the at least one predetermined component also includes ethyl acetate;

said membrane is configured for also passing ethyl acetate in said raw permeate; and said treatment column includes means for base hydrolyzing the ethyl acetate for removing it from the raw permeate.

7. The apparatus of claim 6, wherein the base hydrolyzing means comprises means for defining a region of high pH in said treatment column.

8. The apparatus of claim 1, wherein:

said reverse osmosis unit includes a membrane for passing at least the predetermined component in said raw permeate; and said treatment column is a distillation column for removing at least some of the predetermined component from the raw permeate.

9. The apparatus of claim 8, wherein:

said distillation column comprises means for removing a predetermined component including acetaldehyde; and said purified permeate comprises the distillation residue from the distillation column.

10. The apparatus of claim 8, wherein:

said distillation column comprises means for removing a predetermined component including an alcohol; and said purified permeate comprises the distillation residue from the distillation column.

11. The apparatus of claim 8, wherein:

said distillation column comprises means for removing a predetermined component including an alcohol; and said purified permeate comprises the distillate from the distillation column.

12. A method for treatment of a solution to remove at least one predetermined component, including the steps of:

(1) processing the solution by reverse osmosis for producing a retentate and a raw permeate, with the raw permeate containing the predetermined component;

(2) treating the raw permeate by passing it through an anion exchange column for removing at least a portion of the predetermined component and for producing a purified permeate; and (3) combining the retentate with the purified permeate for producing a treated solution.

13. The method of claim 12, wherein the predetermined component includes acetic acid.

14. The method of claim 12, wherein:

the predetermined component includes ethyl acetate; and step 2 includes the step of base hydrolyzing the ethyl acetate.

15. The method of claim 12, wherein:

the at least one predetermined component includes acetic acid; and step 1 is carried out such that acetic acid is at least partially removed from the retentate and is passed with the raw permeate.

16. The method of claim 12, wherein:

the at least one predetermined component includes ethyl acetate;

step 1 is carried out such that ethyl acetate is at least partially removed from the retentate and is passed with the raw permeate.

17. The method of claim 12, further including, after step 1 and before step 2, the step of:

passing the raw permeate through a low-energy distillation column for selectively removing at least one relatively volatile component, thereby producing a distilled raw permeate; and carrying out step 2 on said distilled raw permeate, for producing the purified permeate and the treated solution with a substantial portion of said relatively volatile component removed.

18. The method of claim 17, wherein said relatively volatile component is at least one of carbon dioxide, $H_2S$, ethyl mercaptan and dimethyl sulfide.

19. A method for treatment of a solution to remove at least one predetermined component, including the steps of:

(1) processing the solution by reverse osmosis for producing a retentate and a raw permeate, with the raw permeate containing the predetermined component;

(2) treating the raw permeate for removing at least a portion of the predetermined component and for producing a purified permeate; and (3) combining the retentate with the purified permeate for producing a treated solution;

wherein:

said at least one predetermined component includes acetaldehyde;

step 2 comprises passing the raw permeate through a low-energy distillation column for selectively removing said acetaldehyde; and the purified permeate comprises the distillate from the distillation column.

20. The method of claim 19, wherein:

step 1 is carried out such that the acetaldehyde is substantially removed from the retentate and is passed with the permeate.

21. A method for treatment of a solution to remove at least one predetermined component, including the steps of:

(1) processing the solution by reverse osmosis for producing a retentate and a raw permeate, with the raw permeate containing the predetermined component;

(2) treating the raw permeate by passing it through a distillation column for producing a first portion higher in alcohol and a second portion lower in alcohol; and (3) combining the retentate with one of said first and second portions for producing a treated solution.

22. The method of claim 21, wherein step 3 includes combining the retentate with said second portion for producing a low-alcohol treated solution.

23. The method of claim 21, wherein step 3 includes combining the retentate with said first portion for producing a high-alcohol treated solution.

24. The method of claim 12, further including the step of:

(4) carrying out steps 1, 2 and 3 on the treated solution, for removing more of the predetermined component from the solution.

25. The method of claim 12, wherein step 1 includes filtering said solution through a reverse osmosis membrane selected for passing acetic acid and ethyl acetate and retaining substantially all malic acid and tartaric acid.

* * * * *

(12) EX PARTE REEXAMINATION CERTIFICATE (6568th)
United States Patent
Smith

(10) Number: US 5,480,665 C1
(45) Certificate Issued: Dec. 16, 2008

(54) APPARATUS AND METHOD FOR REMOVING COMPOUNDS FROM A SOLUTION

(75) Inventor: Clark R. Smith, Santa Rosa, CA (US)

(73) Assignee: Richard Shore Jones, Santa Rosa, CA (US)

Reexamination Request:
No. 90/008,252, Sep. 28, 2006

Reexamination Certificate for:
Patent No.: 5,480,665
Issued: Jan. 2, 1996
Appl. No.: 08/218,920
Filed: Mar. 28, 1994

Related U.S. Application Data

(63) Continuation-in-part of application No. 07/880,659, filed on May 8, 1992, now abandoned.

(51) Int. Cl.
*C12G 3/08* (2006.01)
*C12G 3/00* (2006.01)
*B01D 61/02* (2006.01)

(52) U.S. Cl. .................. 426/490; 210/195.2; 210/257.2; 210/652; 426/271; 426/330.4; 426/330.5; 426/494

(58) Field of Classification Search ......................... None
See application file for complete search history.

(56) References Cited

U.S. PATENT DOCUMENTS

| | | |
|---|---|---|
| 2,682,468 A | 1/1954 | Frampton |
| 3,988,486 A | 10/1976 | Rhein |
| 4,499,117 A | 2/1985 | Bonneau |
| 4,532,140 A | 7/1985 | Bonnome |
| 4,681,767 A | 7/1987 | Weiss |
| 4,804,554 A | 2/1989 | Barth |
| 4,806,244 A | 2/1989 | Guilhem |
| 4,888,189 A | 12/1989 | Gnekow |
| 4,988,525 A | 1/1991 | Gresch |
| 5,057,197 A | 10/1991 | Perry |

OTHER PUBLICATIONS

Vinovation, Inc. & Oenovation International, LLC., Complaint for Patent Infringement, Case No. C06–2026, D.I. No. 1, filed Mar. 16, 2006 in U.S.D.C. for Northern Dist. Of CA.

VA Filtration,Answer and Counterclaim to Complaint for Patent Infringement, Case No. C06–2026, D.I. No. 17, Filed Jun. 5, 2006 in U.S.D.C. for Northern Dist. Of CA.

(Continued)

*Primary Examiner*—Stephen Stein

(57) ABSTRACT

Method and apparatus for the treatment of fluids, particularly wine, to remove unwanted substances. The wine is treated in a reverse osmosis (R.O.) treatment unit, generating a retentate and a raw permeate. The membrane for the R.O. unit is selected to pass in the permeate the unwanted substances, such as volatile acidity (ethyl acetate and acetic acid). The raw permeate is subjected to a treatment column. In the case of volatile acidity, this is an anion exchange column, which removes the acetic acid from the permeate by anion exchange and removes the ethyl acetate by base hydrolysis. This produces a purified permeate, which is depleted in volatile acidity, but contains other components desirable for the wine. The purified permeate is then recombined with the retentate from the R.O. column, and the result is wine with the volatile acidity and little else removed. This wine may be recirculated through the system to remove yet more of the volatile acidity. Before the anion exchange step, a low-energy distillation may be used to remove $CO_2$, $H_2S$, or other relatively volatile compounds. To remove acetaldehyde, a low-energy distillation column is used instead of the anion exchange column, and the distillation residue constitutes the purified permeate that is recombined with the retentate from the R.O. column. A high-energy distillation column may be used to separate out alcohol and water, and then add either the alcohol or the water back to the R.O. retentate, thus producing either a higher alcohol or a lower alcohol beverage.

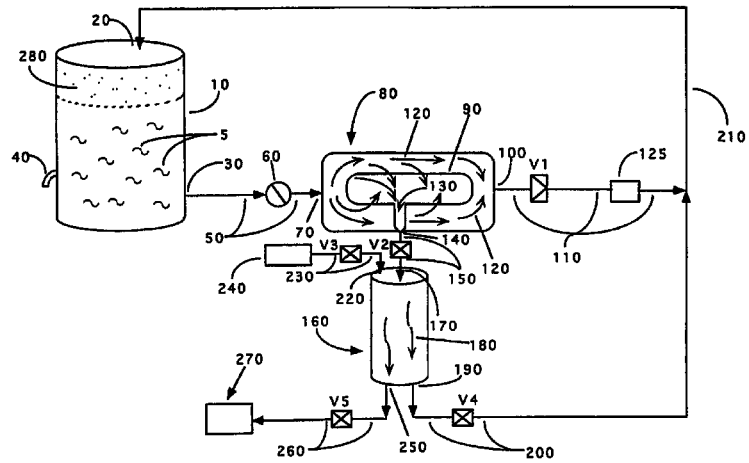

OTHER PUBLICATIONS

Vinovation, Inc. & Oenovation International, LLC., Answer to Counterclaim, Case No. C06–2026, D.I. No. 23, Filed Jul. 26, 2006 in U.S.D.C. for Northern Dist. Of CA.

International Searching Authority, Notification of Transmittal of the International Search Report for PCT/US93/04197, mailed Aug. 11, 1993, see pp. 3–4.

European Patent Office, Communication pursuant to Art. 96(2) and Rule 51(2) EPC for Appl. No. 93911036.7–2113, mailed Jul. 21, 1995, paragraphs 2 and 3 of pp. 3–4.

The American Heritage Dictionary of Science, 1986, p. 456, definition of "organic acid".

CRC Handbook of Chemistry and Physics, 50th Edition, 1969–1970, Chart of "Dissociation Contants of Organic Acids in Aqueous Solutions," p. D–118.

CRC Handbook of Chemistry and Physics, 50th Edition, 1969–170, Chart of "Physical Constants of Organic Compounds," p. C–75.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–5, 8–11, 13 and 15 is confirmed.

Claims 12 and 24 are cancelled.

Claims 19 and 21 are determined to be patentable as amended.

Claims 20 and 22, dependent on an amended claim are determined to be patentable.

Claims 6, 7, 14, 16–18, 23 and 25 were not reexamined.

19. A method for treatment of a solution to remove at least one predetermined component, including the steps of:
  (1) processing the solution by reverse osmosis for producing a retentate and a raw permeate, with the raw permeate containing the predetermined component;
  (2) treating the raw permeate for removing at least a portion of the predetermined component and for producing a purified permeate; and
  (3) combining the retentate with the purified permeate for producing a treated solution;
wherein:
  said at least one predetermined component includes acetaldehyde;
  step 2 comprises passing the raw permeate through a low-energy distillation column for selectively removing said acetaldehyde; and
  the purified permeate comprises the [distillate] *distillation residue* from the distillation column.

21. A method for treatment of a solution to remove at least one predetermined component, including the steps of:
  (1) processing the solution by reverse osmosis for producing a retentate and a raw permeate, with the raw permeate containing the predetermined component;
  (2) treating the raw permeate by passing it through [a] *an atmospheric* distillation column for producing a first portion higher in alcohol and a second portion lower in alcohol; and
  (3) combining the retentate with one of said first and second portions for producing a treated solution.

\* \* \* \* \*